April 3, 1951     L. P. DOSMANN     2,547,694
LATEX DEPOSITED ARTICLE
Filed Nov. 3, 1947

INVENTOR.
LUCIAN P. DOSMANN
BY
ATTORNEY

Patented Apr. 3, 1951

2,547,694

UNITED STATES PATENT OFFICE 2,547,694

LATEX DEPOSITED ARTICLE

Lucian P. Dosmann, South Bend, Ind., assignor to United States Rubber Company, New York, N. Y., a corporation of New Jersey Application November 3, 1947, Serial No. 783,824

4 Claims. (Cl. 117—161)

This invention relates to latex deposited articles, and more particularly to increasing the resistance to scuffing of the same.

Rubber articles are commonly made from natural and synthetic rubber latices by direct deposition processes, such as dipping, spreading and spraying operations. Latex form-dipping processes utilizing a coagulant dip to give the desired thickness of deposit in a subsequent time-controlled latex dip are well known. Rubber sheetings are commonly built up by repeated spreading and drying operations. Latex and coagulant may be sprayed on a form or base to give a smooth surface deposit in the form of a continuous film by coagulating the latex particles after they reach the surface of the form. A rough or pebbled surface may be produced by spraying small amounts of latex and coagulant in such a manner that the latex particles are partially coagulated before they reach the surface of the form, as by regulating the relative supply of latex and coagulant from the spray nozzle, or the distance of the nozzle from the form or base. Latex and coagulant may also be sprayed in larger amounts on a base from a double nozzle spray gun so that the latex and coagulant streams intersect before striking the base and the latex globules are built up on the base in the form of a multiplicity of adjoining irregular spongy pile-like projections giving the exposed surface of the deposit an appearance of a pile carpeting. Such a process of building up a sprayed latex mat is shown in U. S. application Serial No. 550,964, filed August 24, 1944, now Patent No. 2,501,839.

According to the present invention, the resistance to scuffing of articles directly deposited from natural or synthetic rubber latex is increased by incorporating a silicone oil in the latex from which the rubber articles are made.

The accompanying drawing illustrates an enlarged view of a vertical cut through the base of a sprayed mat according to the present invention showing the spongy pile-like projections on the base.

Silicone oils or liquid polymeric silicones are known liquid mixtures of low molecular weight linear polymeric organosiloxanes. The silicone oils which are the present preferred embodiments of the invention are the commercial polymeric dimethyl-siloxanes or liquid polymeric dimethyl silicones which have the formula $$CH_3[(CH_3)_2SiO]_xSi(CH_3)_3$$

where $x$ is 2 to 11. These silicone oils or liquid polymeric dimethyl silicones are generally mixtures of a predominating amount of one polymer of dimethylsiloxane with minor amounts of other polymers of dimethylsiloxanes within the range of the above formula. The viscosities of the methyl silicone oils range between 0.5 and 1000 centistokes at 25° C., and the specific gravities range between .760 and .975 at 25° C. Other liquid polymeric silicones or silicone oils than the methyl silicone oils which may be used in the present invention are the ethyl silicone oils, or polymeric diethylsiloxanes, and the alkyl-aryl silicone oils, e. g. polymeric methyl-phenyl siloxanes and polymeric ethyl-phenyl siloxanes. Some silicone oils are insoluble in and incompatible with natural and synthetic rubbers, and can be incorporated in solid rubber compounds by conventional milling procedures only with the greatest difficulty, if at all. However, the incorporation of the silicone oil in the latex deposited articles of the present invention may readily be accomplished by adding the silicone oil as an emulsion to the latex to give articles directly deposited from the latex of a uniform character and having increased resistance to scuffing and abrasion. For further description of the silicones and silicone oils, reference is made to "Chemistry of the Silicones" by E. G. Rochow, published by John Wiley, N. Y., 1946, particularly chapter 4, pages 60 to 82, on "Properties of the Specific Silicene Polymers," and to the U. S. patents of E. G. Rochow, Nos. 2,258,218; 2,258,220 and 2,258,222.

The present invention may be employed generally in the manufacture of articles deposited directly from natural and synthetic rubber latices, and is particularly adapted to the manufacture of sprayed latex mats having a plurality of pile elements perpendicular to the base, as described above and in U. S. application Serial No. 550,964. The present invention is also particularly adapted to the manufacture of deposited synthetic rubber articles which have an inherently low tensile strength, such as articles deposited from GR-S latex, i. e. butadiene-styrene copolymer latex.

The silicone oil is added to the latex as a water emulsion similar to the conventional incorporation into latex of other compounding ingredients. Soaps or other common surface-active emulsifying agents may be used in preparing the silicone oil emulsion. A sufficient quantity of silicone oil is added to the latex so that a portion of it will come to the surface of the finished article, but without imparting a greasy feel to the article. In order to obtain the advantages of the present invention, the silicone oil should be present in the latex to an extent of at least 1 part by weight per 100 parts of solids of the latex. 2½ to 5 parts by weight of the silicone oil per 100 parts of latex solids is the present preferred amount, but as much as 10 parts by weight per 100 parts of latex solids may be used before the surface of articles deposited from latex will become undesirably slick or greasy to the touch. The result is that the slight film produced on the rubber surface of the finished article reduces the coefficient of friction to the extent that scuffing and abrading are considerably reduced in use of the article. Silicone oil imparts no odor, discolor or adverse characteristics to the rubber compound. It is permanent in its effect and will not leach out in water or volatilize at elevated temperature. A remarkable feature of the use of silicone oil in the present invention is that the desired result of increased resistance to scuffing is accomplished without rendering the surface greasy, as do other materials which would normally be considered for this use. For example, the following materials were incorporated in various latices but they were unsatisfactory in that an undesirably greasy surface resulted in all cases where sufficient quantity was added to provide scuff resistance: various types of petroleum derivatives in the form of waxes, emulsions, and oils; castor oil; wool oil; glycerine; octyl acetate; octyl decyl alcohol.

In the case of sprayed latex mats where the deposited latex particles are built up on the base in the form of a multiplicity of adjoining irregular spongy projections, the article must be resistant to scuffing, which is ordinarily encountered by carpets and automobile kick pads under normal conditions of use. Scuffing is a particularly aggravating problem in the case of these pile mats, since the resistance to scuff of the individual pile elements or projections is determined to a large extent by the tensile strength of the rubber compound. The tensile strength of butadiene hydrocarbon polymer and copolymer synthetic rubbers, such as polybutadiene, copolymers of butadiene and styrene, and copolymers of butadiene and acrylonitrile, are notoriously weak as compared to natural rubber and to neoprene or polychloroprene synthetic rubber, and mats made from latices of such inherently weak synthetic rubbers do not satisfactorily resist ordinary scuffing, the pile elements breaking off where they join onto the base. Methods of increasing the tensile strength of deposits of latices of such inherently weak synthetic rubbers, as by incorporating reinforcing filler materials in the latex compound, did not give sufficient improvement in the tensile strength to effect a satisfactory sprayed mat from such compounds. The application of the present invention is not restricted to the manufacture of deposited articles from latices of inherently weak synthetic rubbers, but may be used with latices of higher strength elastomers, such as natural rubber and polychloroprene, where it similarly increases the resistance to scuffing and abrasion of articles directly deposited therefrom. When silicone oil is used in natural rubber latex and emulsion-polymerizates of chloroprene, such as neoprene or polychloroprene latex, in making sprayed mats, the increased resistance to scuffing and abrasion imparted to articles made therefrom permits mats to be made with higher projections or pile elements, and does not require that the individual pile elements be so closely interlaced for the necessary strength. Thus, by the use of silicone oil in natural rubber latex or neoprene latex, a final product may be obtained which is of a soft plush construction. Without the reduced coefficient of friction by virtue of the incorporation of silicone oil, such higher pile constructions would not be strong enough even with high strength elastomers to withstand severe conditions of use.

In the manufacture of sprayed latex mats, the base may be a calendered or molded natural or synthetic rubber compound, or fabric, or paper board, or hard impregnated board. The base may have a design molded in it to impart such design to the sprayed pile layer. An adhesive may be applied to the base to better secure the latex deposit to the base. A convenient adhesive is an organic solvent cement made from natural or synthetic rubber. The spray gun for building up the pile layer may have two nozzles, one for latex and one for coagulant, joined by a hinge connection so that angularity of one to the other may be adjusted in order that the latex and coagulant sprays can intersect and mingle at any desired point before the spray reaches the surface of the base. It has been found that where the angle between the latex and coagulant nozzles is such that the latex and coagulant streams intersect about three inches from the orifices of the nozzles, and the nozzle sizes and the air pressure are so selected and regulated that the mixed latex and coagulant will be delivered as a gentle spray when the nozzles are held from 2 to 2½ feet from the base, the particles of latex coagula will build up on the base to form a rough stubble layer in which the deposit is in the form of a multiplicity of adjoining irregular spongy projections. The exposed surface of such deposit resembles pile carpeting. With the same adjustments on the spray gun, the pile surfacing will be denser as the distance of the spray gun from the work is decreased. The nozzle and base are moved relatively in parallel relation to distribute the deposit of rubber particles to substantially the same thickness throughout the entire area of the base or mat, and the spraying is continued until the desired depth of pile is obtained. The spray gun may be moved back and forth over the base for this purpose keeping the spray gun at the approximate distance from the base throughout its back and forth movement, or the base may be moved back and forth under a stationary spray gun if desired, or a battery of spray guns may be mounted on a conveyor on which the base is propelled under the spray guns at a proper rate of speed to build up the desired depth of deposit and with the spray guns provided in sufficient number and properly arranged to insure uniformity of depositing throughout the area of the base. After the spraying is completed, the sprayed surfacing and the base if of rubber, are vulcanized.

A synthetic rubber latex composition was prepared by compounding a 60% solids content GR–S latex (aqueous emulsion polymerization of a mixture of 75 parts by weight butadiene-1,3 and 25 parts by weight of styrene) with .5 part potassium hydroxide, 2 parts sulfur, 3 parts zinc oxide, 1.5 parts accelerator per 100 parts of latex solids. All parts herein are by weight. The latex was compounded according to the conventional method of adding the sulfur and zinc oxide in the form of aqueous dispersions. Another GR–S latex composition was prepared in a similar manner but with the addition of 3 parts of a commercial methyl silicone oil per 100 parts of latex solids. The silicone oil was added as a 70% water emulsion prepared with a small amount of potassium oleate emulsifier. The methyl silicone oil used had a viscosity of 334 centistokes at 25° C., and a specific gravity of .957 at 25° C. Pile mats were made from each of these latex compounds by spraying the same onto a hard fiber board base to which an adhesive rubber cement which would bond the rubber particles to the base had been applied. Sprayed mats were made from each latex compound, one with and without the silicone oil addition. In each case, the latex and an aqueous 10% acetic acid coagulant were each sprayed from a nozzle of a double nozzle spray gun adjusted so the latex and coagulant streams met about 3 inches in front of the nozzles. The velocity of the streams was such that the spray gun held 2½ feet from the base built up the desired pile-like texture, and did not develop an excess of force which would compact the deposited particles in a dense mass. The nozzle was maintained 2 to 2½ feet from the base, and the spraying was continued until a rough stubble pile-like deposit was built up on the base to a thickness of about $\frac{3}{32}$ of an inch. The exposed surface of the thus formed rubber deposited layer resembled pile carpeting. Abrasion tests on a standard Taber Abrasion Testing Machine were made on mats made with the GR–S latex compound with and without the methyl silicone oil addition. The tests were conducted using a standard CS 17 abrasive wheel with 1000 gram weight. The test on the GR–S latex compound without the methyl silicone oil addition showed a loss of 150 grams after 1000 cycles, whereas the compound containing the methyl silicone oil showed a loss of only 20 grams after 1000 cycles. The loss in weights were based on averages of five samples. The carpet made from the latex containing the methyl silicone oil was very difficult to scuff by kicking it, whereas the carpet made from latex not containing the silicone oil lost its pile with slight glancing blows from the foot. Although the carpet made from the latex containing the methyl silicone oil felt smoother, it was not greasy or sticky, the feeling being more like a waxed finish. There was no danger of slipping while walking on the mat's surface.

The drawing illustrates a mat made similarly to the above on a fabric base 1 with the pile-like elements 2 built up from the GR–S latex containing the methyl silicone oil.

Sprayed mats were also made in the above manner from natural rubber latex compounds and from neoprene latex compounds. The natural rubber latex compound was made from a 60% solids natural rubber latex and contained 1 part dimethyl amine, 1.5 parts sulfur, 5 parts zinc oxide, 2 parts accelerator, and were compounded with and without 3 parts of the methyl silicone oil, all parts by weight per 100 parts of solids of the latex. Similarly, a neoprene or a polychloroprene latex compound was made by compounding a 60% solids neoprene latex with 1 part sulfur, 5 parts zinc oxide, and with and without 3 parts methyl silicone oil, all parts by weight per 100 parts of the neoprene latex solids. Natural rubber and polychloroprene rubber inherently have a high enough tensile strength so that they readily produced from the latex compounds without the silicone oil sprayed mats having pile thicknesses about $\frac{3}{32}$ of an inch from the base with sufficient scuff and abrasion resistance, for ordinary wear. With the silicone oil additions to the latex compounds, the increase in the physical characteristics by virtue of the methyl silicon oil addition was utilized in producing a very desirable, luxurious high pile construction, the pile height being about $\frac{7}{16}$ of an inch from the base, which, without the silicone oil, would have lowered the requisite scuff and abrasion resistance of the mats to the danger point.

While the above examples show improvements of the present invention by virtue of the addition of methyl silicone oil to natural rubber and certain synthetic rubber latices, it is to be understood that the invention is similarly applicable to the use of other silicone oils, such as ethyl silicone oils, methyl phenyl silicone oils, and ethyl phenyl silicone oils. The invention is also applicable to various synthetic rubber latices, such as emulsion polymerizates where the polymerizable material may be one or a mixture of butadienes-1,3, for example, butadiene-1,3, methyl-2-butadiene-1,3 (isoprene), chloro-2-butadiene-1,3 (chloroprene), piperylene, 2,3-dimethyl butadiene-1,3, or where the polymerizable material may be a mixture of one or more such butadienes-1,3 with one or more other polymerizable compounds which are capable of forming rubbery copolymers with butadienes-1,3, for example, up to 70% of such mixtures of one or more compounds which contain a $CH_2=C<$ group where at least one of the disconnected valences is attached to an electro-negative group, that is, a group which substantially increases the electrical dissymmetry or polar character of the molecule. Examples of such compounds which contain $CH_2=C<$ and are copolymerizable with butadiene-1,3 hydrocarbons are aryl olefines, such as styrene and vinyl naphthylene; the alpha methylene carboxylic acids and their esters nitriles and amides, such as acrylic acid, methyl acrylate, methyl methacrylate, acrylonitrile, methacrylonitrile, acrylamid, methacrylamid; methyl vinyl ether; methyl vinyl ketones; vinylidene chloride. The above polymers of the butadiene-1,3 hydrocarbons and copolymers of the butadiene-1,3 hydrocarbons with compounds which contain a $CH_2=C<$ group are generally those of inferior tensile strength to which the present invention is particularly adapted.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. A mat comprising a base having a rough stubble rubber layer thereon of the direct deposit of solids of a rubber latex selected from the group consisting of natural rubber latex and aqueous emulsion polymerizates of the group consisting of butadienes-1,3 and mixtures of butadienes-1,3 with compounds which contain a $CH_3=C<$ group and are copolymerizable with butadienes-1,3, said rubber latex containing 1 to 10 parts by weight of silicone oil of the composition

$$CH_3[(CH_3)_2SiO]_xSi(CH_3)_3$$

where $x$ is 2 to 11, per 100 parts of solids of the latex, said deposit being composed of rubber particles built up in the form of a multiplicity of adjoining irregular spongy projections, the exposed surface of said deposited layer resembling piled carpeting.

2. A mat comprising a base having a rough stubble synthetic rubber layer thereon of the direct deposit of solids of an aqueous emulsion polymerizate of a mixture of butadiene-1,3 and styrene which contains 1 to 10 parts by weight of silicone oil of the composition $CH_3[(CH_3)_2SiO]_xSi(CH_3)_3$ where $x$ is 2 to 11, per 100 parts of solids of the latex, said deposit being composed of synthetic rubber particles built up in the form of a multiplicity of adjoining irregular spongy projections, the exposed surface of said deposited layer resembling piled carpeting.

3. A mat comprising a base having a rough stubble rubber layer thereon of the direct deposit of solids of a rubber latex selected from the group consisting of natural rubber latex and aqueous emulsion polymerizates of the group consisting of butadienes-1,3 and mixtures of butadienes-1,3 with compounds which contain a $CH_2=C<$ group and are copolymerizable with butadienes-1,3, said rubber latex containing 1 to 10 parts by weight of a liquid polymeric dimethyl silicone per 100 parts of solids of the latex, said deposit being composed of rubber particles built up in the form of a multiplicity of adjoining irregular sponge projections, the exposed surface of said deposited layer resembling piled carpeting.

4. A mat comprising a base having a rough stubble synthetic rubber layer thereon of the direct deposit of solids of an aqueous emulsion polymerizate of a mixture of butadiene-1,3 and styrene which contains 1 to 10 parts by weight of a liquid polymeric dimethyl silicone per 100 parts of solids of the latex, said deposit being composed of synthetic rubber particles built up in the form of a multiplicity of adjoining irregular spongy projections, the exposed surface of said deposited layer resembling piled carpeting.

LUCIAN P. DOSMANN.

REFERENCES CITED

The following references are of record in the file of this patent:

UNITED STATES PATENTS

| Number | Name | Date |
|---|---|---|
| 2,056,406 | Mayne | Oct. 6, 1936 |
| 2,258,220 | Rochow | Oct. 7, 1941 |
| 2,293,928 | Beal | Aug. 25, 1942 |
| 2,375,007 | Larsen et al. | May 1, 1945 |
| 2,467,708 | Sturgis | Apr. 19, 1949 |
| 2,470,772 | Haas | May 24, 1949 |

OTHER REFERENCES

Pages 577 to 582, The Rubber Age, Sept. 1944.
India Rubber World; May 1947, page 214.